Figure 1:
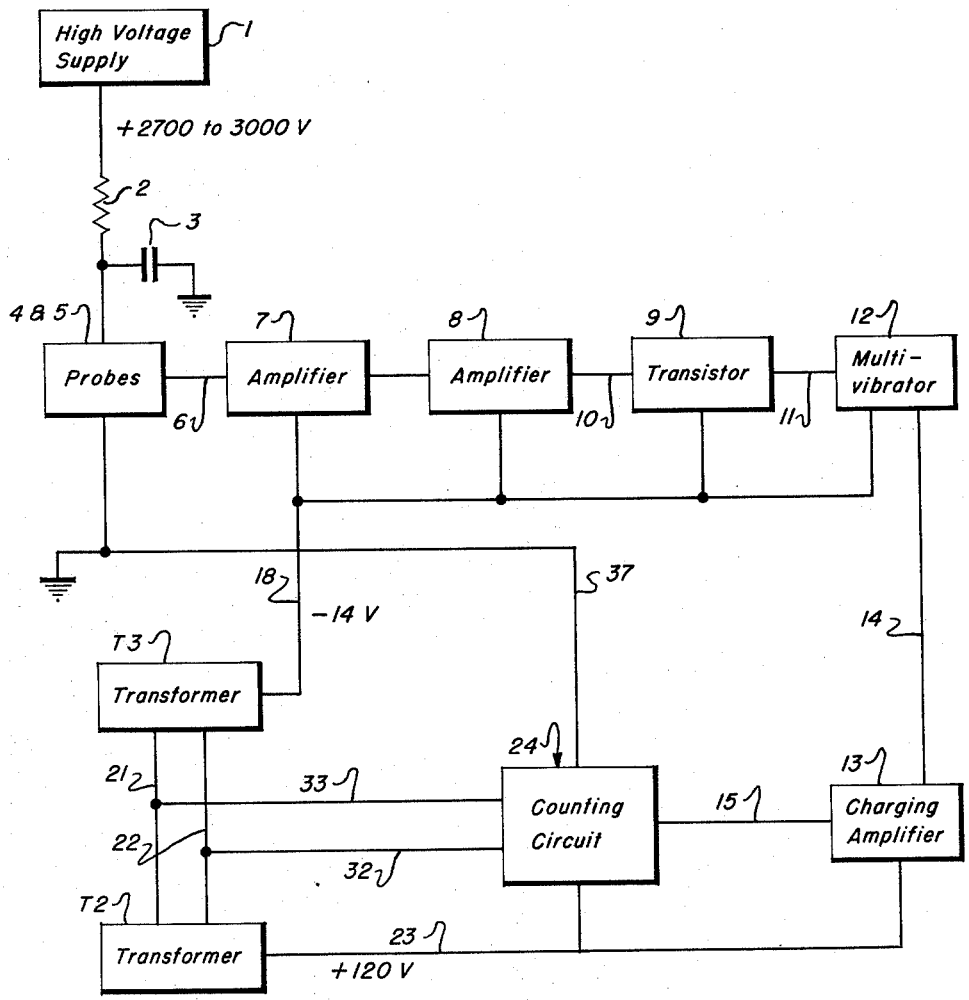

June 11, 1963  J. R. MANN ETAL  3,093,738
AUTOMATIC HAND COUNTER FOR ALPHA PARTICLE COUNTING
Filed Jan. 18, 1961  2 Sheets-Sheet 1

INVENTORS:
John R. Mann
Arthur E. Wainwright
BY

Attorney

June 11, 1963　　　J. R. MANN ETAL　　　3,093,738
AUTOMATIC HAND COUNTER FOR ALPHA PARTICLE COUNTING
Filed Jan. 18, 1961　　　　　　　　　　　　　　2 Sheets-Sheet 2

INVENTORS:
John R. Mann
Arthur E. Wainwright
BY

*Attorney*

United States Patent Office 3,093,738
Patented June 11, 1963

3,093,738
AUTOMATIC HAND COUNTER FOR ALPHA PARTICLE COUNTING
John R. Mann, Nashville, Tenn., and Arthur E. Wainwright, Golden, Colo., assignors to the United States of America as represented by the United States Atomic Energy Commission
Filed Jan. 18, 1961, Ser. No. 83,598
5 Claims. (Cl. 250—83.6)

The present invention relates generally to a new and improved radiation counter and more particularly to an improved alpha particle counter for the detection of radioactive materials on the hands of personnel working in an environment subject to alpha particle contamination.

Radioactive contamination of personnel working in the vicinity of radioactive materials presents a serious problem and without a proper radiation detection system such contamination could very well have very serious detrimental effects upon the safety of the working personnel. Radiation counters of the prior art attempted to cope with the above mentioned problem in various ways, e.g., a radiation detection device using several counter tubes in which the pulses from the tubes are amplified, passed through a univibrator and integrated for indicating radiation dosage. While the prior art methods for detecting radiation are sufficient in some applications, they suffer many drawbacks which render their continued use in many environments questionable. One of the greatest drawbacks in the prior art which the present invention obviates is the inaccurate determination of a safe count by personnel failing to allow sufficient time for analysis. The prior art does not count the radioactive materials on the hands of the working personnel for a specific time period. This could cause a person to be given a "cold" reading, when actually the person is "hot" or the converse due to the fact that the person may remove his hands from the sensitive volume before sufficient time has elapsed for the counter to correctly indicate the probable condition.

The present invention obviates or minimizes false readings by counting the alpha particle radiation only during a certain and predetermined unit of time. If during this time limit the count reaches a level sufficient to be "hot" then the appropriate signal will be given, but if the "hot" level is not reached during this time limit then the "safe" reading can accurately be given.

The present invention also minimizes the chance of error in giving a radiation reading per unit of time by providing a device which is substantially automatic in its operation so as to have complete control over the radiation counting circuits and the timing circuits through the use of a single starting switch.

An object of the present invention is to provide a radiation counter of simple, inexpensive yet highly accurate design.

Another object of this invention is to provide a radiation detector adapted to count only during a certain predetermined unit of time.

A further object of this invention is to provide a radiation counter which is substantially automatic in its operation.

A still further object of the present invention is to provide a radiation counter that can be readily adjusted to vary the time limits of the counter operation, the settings on the "hot" and "safe" counters so as to be adaptable to different environments, and the time of the holding circuit for giving the person operating the device a sufficient time period for noting the "hot" or "safe" reading.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

Figure 2:
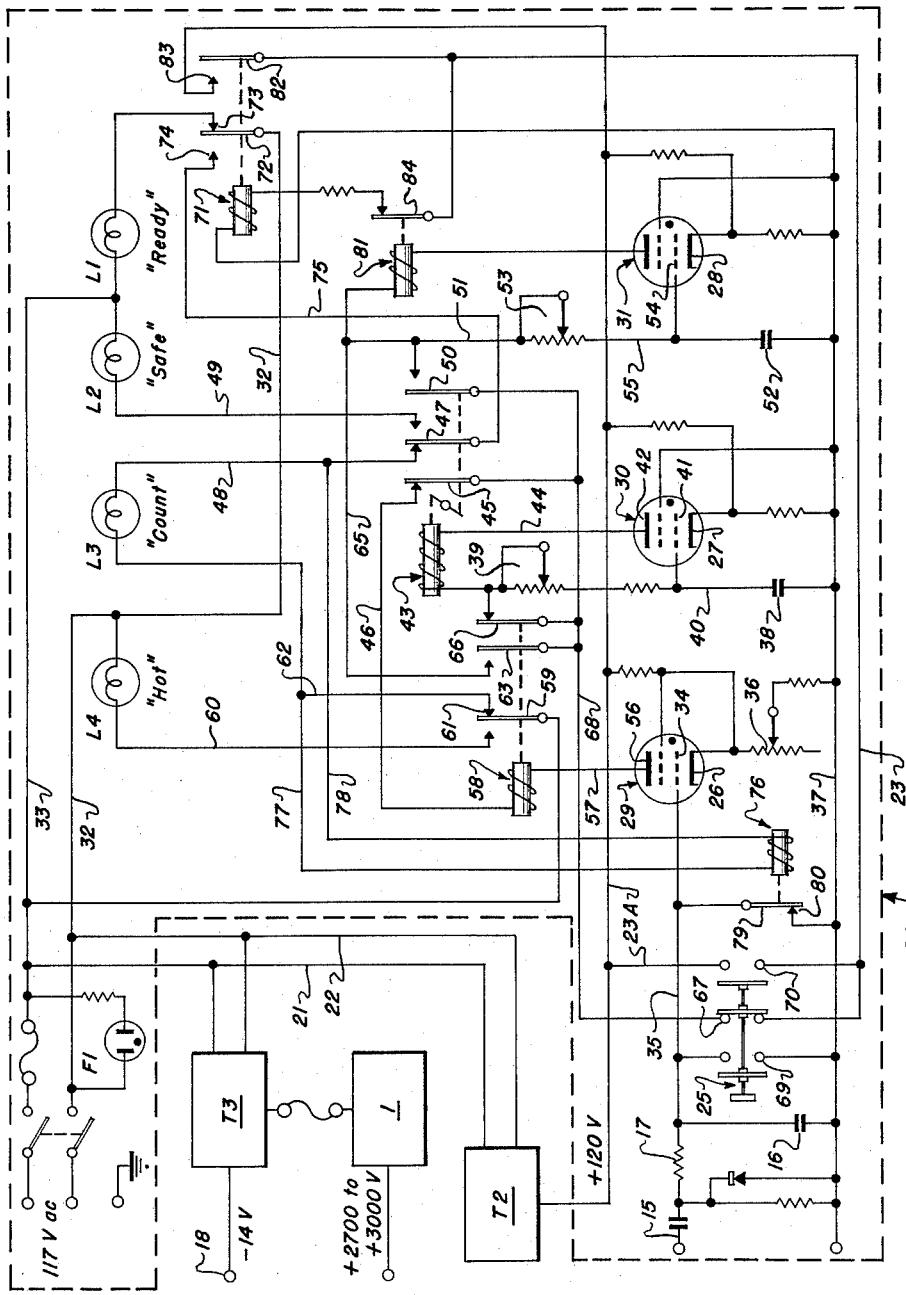

In the accompanying drawings:

FIG. 1 is a view showing a general arrangement of the present invention, the circuit being separated into blocks or sections; and FIG. 2 is view of the present invention showing the counter circuit portion in greater detail.

Described generally the present apparatus or device comprises an alternating current powered transistorized high voltage supply 1 of 2700–3000 volts coupled through a suitable filtering circuit, including a 6.8 megohm resistor 2 and a .01 microfarad capacitor 3, to two alpha particle counting probes 4 and 5. Negative pulses from the probes are amplified when transmitted through lead 6 to two transistorized gain-of-10 amplifiers 7 and 8. Transistor 9 is connected by conductor 10 to amplifier 8 to receive the amplified pulse for reversing the pulse phase. The pulse is then sent through leads 11 to trigger the transistorized one-shot multivibrator 12. A charger amplifier 13 receives through lead 14 the uniform pulse from the multivibrator 12 and amplifies the pulse and passes the same through conductor 15 to the accumulating or charging capacitor 16 and the resistor 17, which may have values of 1 microfarad and 11 megohms respectively, of the counting circuit as indicated generally by numeral 24. Transformer T3 is part of a low voltage supply which delivers a negative 14 volts to the transistorized circuits 7, 8, 9 and 12 through lead 18.

Transformer T2 is part of a plate (B+) supply which provides a positive 120 volts D.C. for the counting circuit 24 through coupling 23. The lighting circuit F1, as best shown in FIG. 2, is coupled through conductors 32 and 33 to a suitable 117 volt alternating current output and is used to operate the signal lights L1 to L4 of the counting circuit. Within the counting circuit are the three thyratrons 29, 30, and 31 each of which performs a different function as will soon be described in detail.

The particular construction of probes and the amplifying circuit used in connection with the counting circuit for sensing and amplifying the radiation signal do not form part of the present invention and the discussion thereof will be limited to the general description given above. It should be noted that several types of alpha particle counters will work satisfactorily with the counting circuit, an example of one type counter probe which may be used is an air proportional type probe. Other suitable commercially available, alpha particle type counter probes which can be used in connection with the present invention will be ovious to those skilled in the art when practicing the invention.

Where an aural indication of the count rate is desirable an audio amplifier may be placed in the amplifying circuit of the counter so as to be coupled to transformer T2 and arranged to receive the uniform pulse from the multivibrator 12.

As shown in FIG. 2 the counting circuit includes a first "hot" thyratron 29, with the grid 34 being coupled by lead 35 to the capacitor 16. The voltage necessary for firing the thyratron 29 is determined by the bias on the cathode 26. An adjustable potentiometer 36 determines this bias and it may be set to correspond to, for example, an accumulation of 3 to 9 pulses. The time constant of the accumulating or charging circuit 16 may be, for example, 11 seconds. This time constant allows the time versus voltage characteristic to be linear up to about 9 or 10 seconds. Therefore, once the minimum specified count is exceeded, the charging or accumulating circuit 16 never has time to discharge between pulses so that a linear system is preserved. The second "counting" thyratron 30 is energized through contact 67 at the same instant as the first thyratron. The firing of this thyratron is controlled by a capacitor 38, having, for example, a capacity of 4 microfarads and an adjustable potentiometer 39 which are connected by conductor 40 to the grid 41 of the thyratron 30 and determine the time required for the count. When the predetermined count time is up, the thyratron fires permitting the current imposed on plate 42 to energize relay 43 through lead 44. This relay moves switch 45 opening lead 46 thus cutting off B+ voltage to the "hot" thyratron 29, opens the switch 47 of circuit line 48 to the "count" light (L3), closes the switch 47 of the circuit line 49 to the "safe" light (L2) for turning it on. At the same instant, switch 50 closes the B+ voltage path through lead 51 to the third "hold" thyratron 31 which starts the holding time. The "holding" thyratron circuit operates in the same manner as the "counting" thyratron, i.e., a capacitor 52 and an adjustable potentiometer 53 which is conntcted to the grid 54 by conductor 55 and is set to hold the thyratron 31 from firing for a predetermined time, thus holding the "safe" light (L2) or the "hot" light (L4) on until the person using the counter has sufficient time to make a reading.

When thyratron 29 fires, due to the charge on the capacitor 16 overcoming the bias 36, the plate 56 picks up the plate current, passes it through conductor 57 and energizes relay 58 thus causing the following simultaneous sequence of operation; switch 59 of the lead 60 to the "hot" light (L4) closes turning the "hot" light on, contact 61 of conductor 62 to the "count" light (L3) opens extinguishing the latter, the switch 63 for energizing the "holding" thyratron 31 through conductors 65, 51 closes, and the switch 66 for the B+ voltage path 40 to the second "count" thyratron 30 is opened. The firing of the "hot" thyratron 29 causes the holding thyratron 31 to operate in the same manner as when the "counting" thyratron 30 fires.

The control for the above operation of the various thyratrons is attained through a push button starting switch 25, which when in a depressed position opens contact 67 opening the B+ voltage paths 23 and 68 of all three thyratrons, shorts out capacitor 16 through contact 69, closes contact 70 and supplies B+ voltage through lead 23A to relay 71 for moving switch 72 thus opening contact 73 turning off the "ready" light (L1), and closes contact 74 energizing lead 75 for turning on the "count" light (L3). The starting switch also energizes relay 76 through conductors 75, 48, 77 and 78 for moving switch 79 and opening contact 80 of one of the shorts across the capacitor 16. When the starting switch is released the second short 69 across the capacitor 16 is opened allowing the accumulating or charging circuit 16 to operate, contact 67 closes for supplying B+ voltage through conductor 68 to all three thyratrons and the counting system now begins the radiation count.

*Operation*

When a person desires to take the alpha particle count on his hands, he depresses the starting button 25 for putting the counter in an armed condition by closing contact 69 shorting out the capacitor 16 thus preventing it from being charged with the pulses received from the probe amplifying circuit. The opening of contact 67 opens the B+ voltage path to all three thyratrons for de-energizing them. The movement of the button 25 also closes contact 70 and supplies B+ voltage to relay 71 which turns the "ready" light (L1) off and the "count" light (L3) on.

The circuit of the "count" light is coupled to relay 76 for opening one of the shorts across charging capacitor 16. Nothing else happens in the operation of the counting circuit until the starting button 25 is released, and when this is done the following operating sequence takes place. Contact 69 opens the second short across the capacitor allowing the charging circuit to operate, and contact 67 closes for supplying the thyratron with B+ voltage. The "hot" thyratron 29 remains off until the minimum number of pulses necessary for triggering is reached. The circuit of the "counting" thyratron 30 becomes energized with the release of the start button 25 and if the capacitor 38 becomes charged with a sufficient charge to overcome the bias of the potentiometer 39 before the capacitor 16 overcomes the bias of potentiometer 36, then the "count" thyratron will fire energizing relay 43 which opens the B+ voltage path to the "hot" thyratron 29, turns off the "count" light (L3) and turns on the "safe" light (L2), de-energizes relay 76 shorting out capacitor 16 and closes the B+ voltage path to the "holding" thyratron. If, however, the minimum charge necessary for triggering the "hot" thyratron 16 is exceeded before the capacitor 38 has been sufficiently charged to overcome its bias, then the thyratron 29 is fired, energizing relay 58, which opens the B+ voltage path to the "count" thyratron, turns off the "count" light (L3) and the "hot" light (L4) on, and closes the B+ voltage path to the "holding" thyratron to begin the "hold" time.

When either the "hot" thyratron or the "count" thyratron is fired and the B+ voltage path to the "hold" thyratron is closed the operation will be the same. The firing of the "hold" thyratron is determined by the bias on potentiometer 53 and when this bias is overcome the thyratron fires energizing relay 81 which opens the contact 84 to relay 71 which in turn extinguishes either the "safe" or "hot" light and turns the "ready" light on. The de-energizing of relay 71 also opens the B+ voltage line to all thyratrons by moving switch 82 and opening contact 83 and thus returning the whole counting circuit to the normal position, ready for the next count.

It will be seen that the counting circuit of the present invention provides a very reliable radiation detector that is substantially automatic in operation with all the timing of the circuits being done electronically.

The present invention also provides the very desirable feature of preventing radiation count during non-operating conditions by providing the charging circuit with suitable shorts for preventing any buildup on the charging capacitors.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. A radiation counter of the type disclosed comprising in an operatively associated combination a high voltage supply means operatively connected to probe means, said probe means being adapted to sense radioactive particles and give off pulses indicative to the degree of radiation, pulse amplifying means adapted to receive said pulse, a counter means including a charging circuit coupled to receive the amplified pulses, normally non-conducting thyratron means coupled to said charging circuit, bias adjusting means operatively associated with said thyratron means and adapted to be overcome by the charging circuit to provide conduction of the thyratron means, means for coupling the output of said thyratron means with signal means, and push button switch means in said counter means for de-energizing said thyratron means and shorting said charging circuit when depressed and for energizing said thyratron means and removing said short when released.

2. The radiation counter as claimed in claim 1 wherein said thyratron means includes a plurality of thyratrons, one being connected to the charging circuit through coupling means including capacitor means and having the bias adjusting means in the coupling to the thyratron cathode, relay means and contact means operatively associated with the output circuit of said one thyratron for energizing a "hot" portion of said signal means when said pulses exceed a preselected minimum charge on said capacitor means for overcoming the bias on said one thyratron.

3. The radiation counter as claimed in claim 2 wherein another of said thyratrons is coupled to the charging circuit and has bias adjusting means in combination therewith for setting a predetermined counting time in the firing system of said other thyratron, a second set of relay means and contact means operatively coupled to the output of said other thyratron for energizing a "safe" portion of the signal means when said predetermined time is reached, said second relay means having additional switch means for opening the output circuit of said one thyratron.

4. The radiation counter as claimed in claim 3 wherein the relay means of said first mentioned thyratron are coupled to the output circuit of said other thyratron for de-energizing the latter when said first relay means are activated.

5. The radiation counter as claimed in claim 4 wherein an additional thyratron, including bias adjusting means, relay means and contact means, is coupled into said counter means and is adapted upon receiving a signal from the relay means of either of the first mentioned thyratrons to hold the respective signal for a preselected unit of time, determined by the bias setting of said additional thyratron, which upon firing, actuates the relay means operatively associated with said additional thyratron for releasing the hold on said signal, de-energizes all thyratron output circuits and returns the counter means to a pre-signal condition.

References Cited in the file of this patent
UNITED STATES PATENTS

| | | |
|---|---|---|
| 2,913,581 | Simonton et al. | Nov. 17, 1959 |
| 2,984,746 | Speh et al. | May 16, 1961 |